(12) United States Patent
Miyano

(10) Patent No.: US 11,734,443 B2
(45) Date of Patent: Aug. 22, 2023

(54) INFORMATION CONTROL PROGRAM, INFORMATION CONTROL SYSTEM, AND INFORMATION CONTROL METHOD

(71) Applicant: CREATOR'S HEAD INC, Tokyo (JP)

(72) Inventor: Yoshihide Miyano, Tokyo (JP)

(73) Assignee: CREATOR'S HEAD INC., Tokyo (JP)

( * ) Notice: Subject to any disclaimer, the term of this patent is extended or adjusted under 35 U.S.C. 154(b) by 874 days.

(21) Appl. No.: 16/479,477

(22) PCT Filed: Jan. 19, 2017

(86) PCT No.: PCT/JP2017/001751
§ 371 (c)(1),
(2) Date: Jul. 19, 2019

(87) PCT Pub. No.: WO2018/134945
PCT Pub. Date: Jul. 26, 2018

(65) Prior Publication Data
US 2019/0392167 A1 Dec. 26, 2019

(51) Int. Cl.
*G06F 21/62* (2013.01)
*G06F 3/12* (2006.01)
*G06F 21/60* (2013.01)

(52) U.S. Cl.
CPC ........ *G06F 21/6227* (2013.01); *G06F 3/1222* (2013.01); *G06F 3/1238* (2013.01); *G06F 21/602* (2013.01)

(58) Field of Classification Search
CPC .. G06F 21/6227; G06F 3/1222; G06F 3/1238; G06F 21/602; G06F 21/606; H04L 9/10; H04L 9/16
See application file for complete search history.

(56) References Cited

U.S. PATENT DOCUMENTS 6,978,378 B1 * 12/2005 Koretz ............... H04L 63/0428
  713/193
8,191,162 B1 *  5/2012 Shukla ............... G06F 21/6227
  726/28
(Continued)

FOREIGN PATENT DOCUMENTS

AU  2005200290 A1 *  2/2005  ............. G06F 21/10
CN     1783038 A  *  6/2006  ............ G06F 21/556
(Continued)

OTHER PUBLICATIONS

International Search Report dated Apr. 4, 2017 for PCT/JP2017/001751.

*Primary Examiner* — Shahriar Zarrineh
(74) *Attorney, Agent, or Firm* — Fresh IP PLC; Clifford D. Hyra; Aubrey Y. Chen

(57) ABSTRACT

Disclosed are programs, systems, and methods which are capable of using an application program previously used without modification and improving a security counter-measure when a data file is browsed and edited in a user terminal without installing a new security counter-measure program. An information control program has a function of adding a predetermined modification to transmitted/received information, which is transmitted and received between an OS and an application which is capable of generating a data file and saving the data file to an arbitrary information storage area. A save restriction function of restricting saving of the file not encrypted using a predetermined encryption key, a storage destination restriction function of restricting an area other than a predetermined area from being designated as the file storage destination, and a decrypting function of decrypting the file stored in the predetermined area using the predetermined encryption key are provided.

13 Claims, 14 Drawing Sheets

(56) References Cited

U.S. PATENT DOCUMENTS

| | | | |
|---|---|---|---|
| 8,510,846 B1* | 8/2013 | Gunnarson | G06F 21/80 726/26 |
| 8,826,452 B1* | 9/2014 | He | G06F 21/84 726/27 |
| 9,148,428 B1* | 9/2015 | Banga | G06F 9/45558 |
| 10,003,588 B2 | 6/2018 | Abe | |
| 10,007,809 B1* | 6/2018 | Douglis | H04L 9/0894 |
| 10,387,669 B1* | 8/2019 | Lim | G06F 21/604 |
| 2003/0154381 A1* | 8/2003 | Ouye | G06F 21/6227 713/182 |
| 2008/0091833 A1* | 4/2008 | Pizano | H04L 63/06 709/229 |
| 2010/0050257 A1 | 2/2010 | Jin | |
| 2010/0192234 A1* | 7/2010 | Sugimoto | G06F 21/6209 726/30 |
| 2010/0205561 A1* | 8/2010 | Chen | G06F 3/0481 715/810 |
| 2011/0179366 A1* | 7/2011 | Chae | G06F 21/84 715/764 |
| 2012/0017095 A1* | 1/2012 | Blenkhorn | G06F 21/602 713/189 |
| 2013/0247220 A1* | 9/2013 | Bingell | G06F 21/6245 726/28 |
| 2014/0258711 A1* | 9/2014 | Brannon | H04L 63/0823 713/156 |
| 2015/0379295 A1* | 12/2015 | Branton | G06F 21/6218 713/165 |
| 2016/0147944 A1* | 5/2016 | Douglass | G06F 21/31 705/51 |
| 2016/0371495 A1* | 12/2016 | Bhat | G06F 21/445 |
| 2017/0076074 A1* | 3/2017 | Yamamoto | H04W 12/08 |
| 2018/0307855 A1* | 10/2018 | Dogu | G06F 16/176 |
| 2021/0319083 A1* | 10/2021 | Bernardi | H04L 9/14 |

FOREIGN PATENT DOCUMENTS

| | | | | |
|---|---|---|---|---|
| CN | 1878279 A | * | 12/2006 | G11B 20/00086 |
| CN | 101853184 A | * | 10/2010 | G06F 11/1469 |
| CN | 105205403 A | * | 12/2015 | G06F 21/602 |
| EP | 1380916 A1 | * | 1/2004 | G06F 21/6227 |
| EP | 2009895 A1 | * | 12/2008 | H04N 1/00838 |
| EP | 3876127 A1 | * | 9/2021 | G06F 21/335 |
| JP | H11136506 A | * | 5/1999 | |
| JP | 11-149414 A | | 6/1999 | |
| JP | 2001202280 A | * | 7/2001 | |
| JP | 2001285731 A | * | 10/2001 | H04N 5/913 |
| JP | 2003099332 A | * | 4/2003 | G06F 21/10 |
| JP | 2003274338 A | * | 9/2003 | |
| JP | 2003290196 A | * | 10/2003 | |
| JP | 2004199318 A | * | 7/2004 | |
| JP | 2005130028 A | * | 5/2005 | G06F 21/602 |
| JP | 2005178070 A | * | 7/2005 | |
| JP | 2007188445 A | * | 7/2007 | |
| JP | 2008047085 A | * | 2/2008 | G06F 21/34 |
| JP | 2009070158 A | * | 4/2009 | |
| JP | 2010-509654 A | | 3/2010 | |
| JP | 2010-282606 A | | 12/2010 | |
| JP | 2016/184911 A | | 10/2016 | |
| KR | 20070120222 A | * | 12/2007 | |
| KR | WO2008/056944 A1 | | 5/2008 | |
| KR | 20090072717 A | * | 2/2009 | |
| KR | 20100074818 A | * | 7/2010 | |
| RU | 2623887 C2 | * | 6/2017 | G06F 21/57 |
| WO | WO-0154099 A1 | * | 7/2001 | G06F 21/10 |
| WO | WO-2016175334 A1 | * | 11/2016 | G06F 21/32 |
| WO | WO-2021217899 A1 | * | 11/2021 | G06F 21/602 |

* cited by examiner

INFORMATION CONTROL PROGRAM, INFORMATION CONTROL SYSTEM, AND INFORMATION CONTROL METHOD

TECHNICAL FIELD

The present invention relates to an information control program, an information control system, and an information control method, and more particularly, to an information control program, an information control system, and an information control method for preventing information leak of a data file.

BACKGROUND ART

With the spread of information devices capable of performing a high-speed process and the spread of network devices, the importance of security countermeasures for digital information is increasing. The demand for centralized management of confidential information in organizations is increasing, and countermeasures for security of storage servers or online storage servers managed by the organizations have been taken (for example, Patent Document 1).

CITATION LIST

Patent Document

Patent Document 1: JP 2016-184911 A

SUMMARY OF THE INVENTION

Problem to be Solved by the Invention

However, functions of application programs for browsing and editing information are diverse and complicated, and there are cases in which it is difficult to execute such application programs on a server. For this reason, in order to browse and edit information on a server, information is often downloaded to a terminal of a user. The demand for security countermeasure in a situation in which information is downloaded to the terminal of the user is increasing.

Moreover, the conventional security countermeasure is realized by changing control of an application program itself or of an operating system itself. Therefore, an application program previously used may be unable to be utilized without modification, or it may be necessary to install a new security counter-measure program.

The present invention was made in light of the foregoing, and it is an object of the present invention to provide an information control program, an information control system, and an information control method which are capable of using an application program previously used without modification and improving a security counter-measure when a data file is browsed and edited in a terminal of a user without installing a new security counter-measure program.

Means for Solving the Problem

To solve the above problems, the present invention has the following configuration.

(1) An information control program includes a function of adding a predetermined modification to a transmitted/received information which is transmitted and received between an operating system and an application program, the application program being executable on the operating system and capable of generating a data file and saving the data file to an arbitrary information storage area as a storage destination, the function of adding the predetermined modification including a save restriction function of restricting saving of the data file not encrypted using a predetermined encryption key, a storage destination restriction function of restricting an area other than a predetermined area in the information storage area from being designated as the storage destination of the data file, and a decrypting function of decrypting the data file stored in the predetermined area using the predetermined encryption key.

Further objects or other features of the present invention will be made clear by exemplary embodiments to be described below with reference to the attached drawings.

Advantageous Effects of the Invention

According to the present invention, it is possible to provide an information control program, an information control system, and an information control method which are capable of using an application program previously used without modification and improving a security countermeasure when a data file is browsed and edited in a terminal of a user without installing a new security counter-measure program.

DESCRIPTION OF THE EMBODIMENTS

First Embodiment

Figure 1:
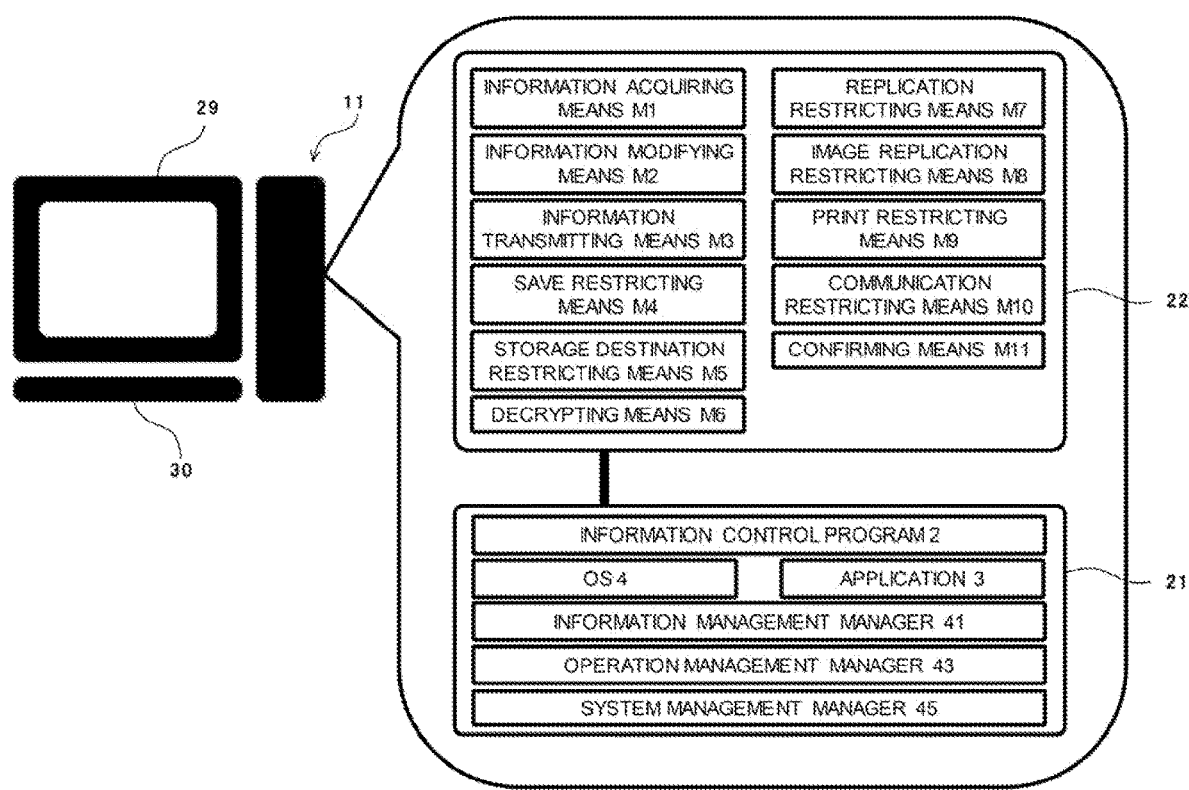
FIG. 1 is a schematic diagram illustrating an internal configuration of a user terminal 11.

A first embodiment which is an embodiment of an information control program 2 of the present invention will be described below with reference to the drawings. In the first embodiment, an information control program 2 dedicated to a document preparation application as an application program (hereinafter also referred to as an "application") 3 will be described. The application program 3 is not limited to the document preparation application and may include various programs that can be executed in conjunction with an operating system 4 such as a spreadsheet application, an image creation application, an e-mail sending/receiving application, a social networking service (SNS) application, or the like. In the first embodiment, when the application 3 is a document preparation application, a data file is a document file (hereinafter also referred to as a "file") 51 or the like generated by the document preparation application. Various setting information files and the like generated by the application 3 and the OS 4 to operate and control the application 3 are assumed not to be included in the data file. The application 3 has a function of generating the data file and storing the generated data file by designating an arbitrary information storage area as a storage destination.

The operating system (hereinafter also referred to as an "OS") 4 is not limited as long as it can execute the application 3. The information control program 2 adds predetermined modifications to transmitted/received information 50 between the OS 4 and the application 3. The information control program 2 can add predetermined modifications to transmitted/received information 50 between the OS 4 and a plurality of applications 3. The transmitted/received information 50 transmitted and received between the OS 4 and the application 3 is information such as control information 53 such as various types of instructions or commands, the data file, or the like which is transmitted and received by the application 3 and the OS 4.

FIG. 1 is a schematic diagram illustrating an internal configuration of a user terminal 11. The user terminal 11 is a computer terminal used by a user U and includes a display device 29, an input device 30, and the like, and includes a storage unit 21, a central processing unit (CPU) 22, and the like is a main body. In the first embodiment, a predetermined area 20 is placed in the storage unit 21 which is an information storage area. A location at which the predetermined area 20 is placed is not limited to the storage unit 21 and may be in a storage unit 23 of a server terminal 13 connected communicably with the user terminal 11. At this time, it is desirable that the user terminal 11 and the server terminal 13 can communicate in a secret state by an encryption means such as secure sockets layer (SSL). The computer terminal may be a desktop type or laptop type personal computer or a mobile terminal such as a smartphone or a tablet terminal which can be used by the user U. The storage unit 21 stores programs such as the information control program 2, the application 3, the OS 4, and an information management manager 41. It is possible to cause the CPU 22 to function as various means by allowing the CPU 22 to execute the programs. As various means, for example, it is possible to cause the CPU 22 to function as various means such as an information acquiring means M1, an information modifying means M2, an information transmitting means M3, a save restricting means M4, a storage destination restricting means M5, a decrypting means M6, a replication restricting means M7, an image replication restricting means M8, a print restricting means M9, a communication restricting means M10, and a confirming means M11 by allowing the CPU 22 to execute the information control program 2.

Figure 2:
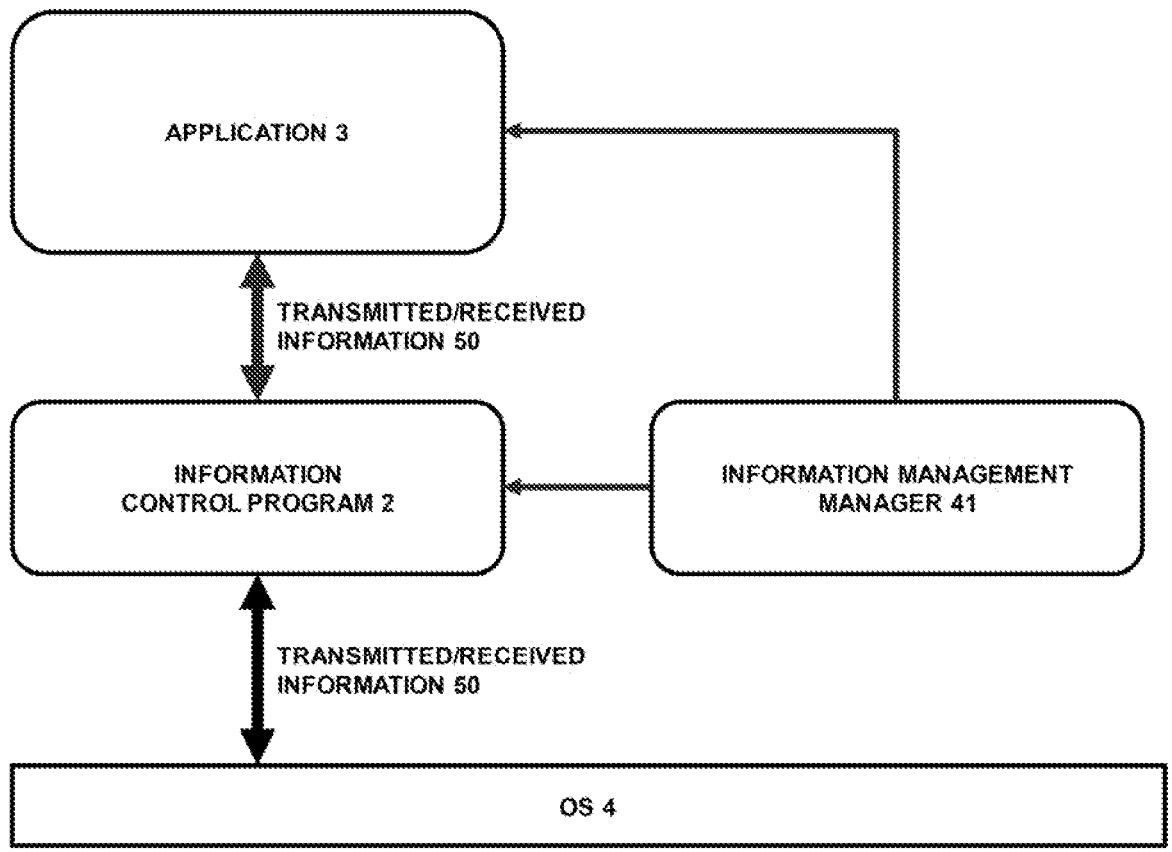
FIG. 2 is a schematic diagram illustrating an embodiment of an information control program 2.

FIG. 2 is a schematic diagram illustrating an embodiment of the information control program 2. The application 3 operates in conjunction with the OS 4, and the transmitted/received information 50 including various types of file 51 or the control information 53 is transmitted from the application 3 to the OS 4 and from the OS 4 to the application 3. The transmitted transmitted/received information 50 is received by the application 3 or the OS 4. The information control program 2 can acquire, monitor, and control the files 51 or the control information 53 which are transmitted and received between the application 3 and the OS 4. A technique in which such a program is inserted between the application program and the operating system, monitors, and controls information transmitted and received therebetween is often referred to as an application program interface (API) hook, a system call hook, or the like. Since the information control program 2 monitors and controls the transmitted/received information 50 transmitted and received between the application 3 and the OS 4 as described above, the application 3 formerly used can be used without modification. Further, the information control program 2 need not be installed in the OS 4 because the control of the OS 4 itself is not changed.

Hereinafter, "the information control program 2 is inserted between application 3 and OS 4 and monitors and controls the information transmitted/received therebetween" is described as "the information control program 2 controls the application 3." Various functions of the information control program 2 will be described later. The information management manager 41 illustrated in FIG. 2 is a program that controls activation of the information control program 2 and the application 3 or some functions of the application 3, and operates in conjunction with the OS 4. Various functions performed by the information management manager 41 will also be described later.

Figure 3:
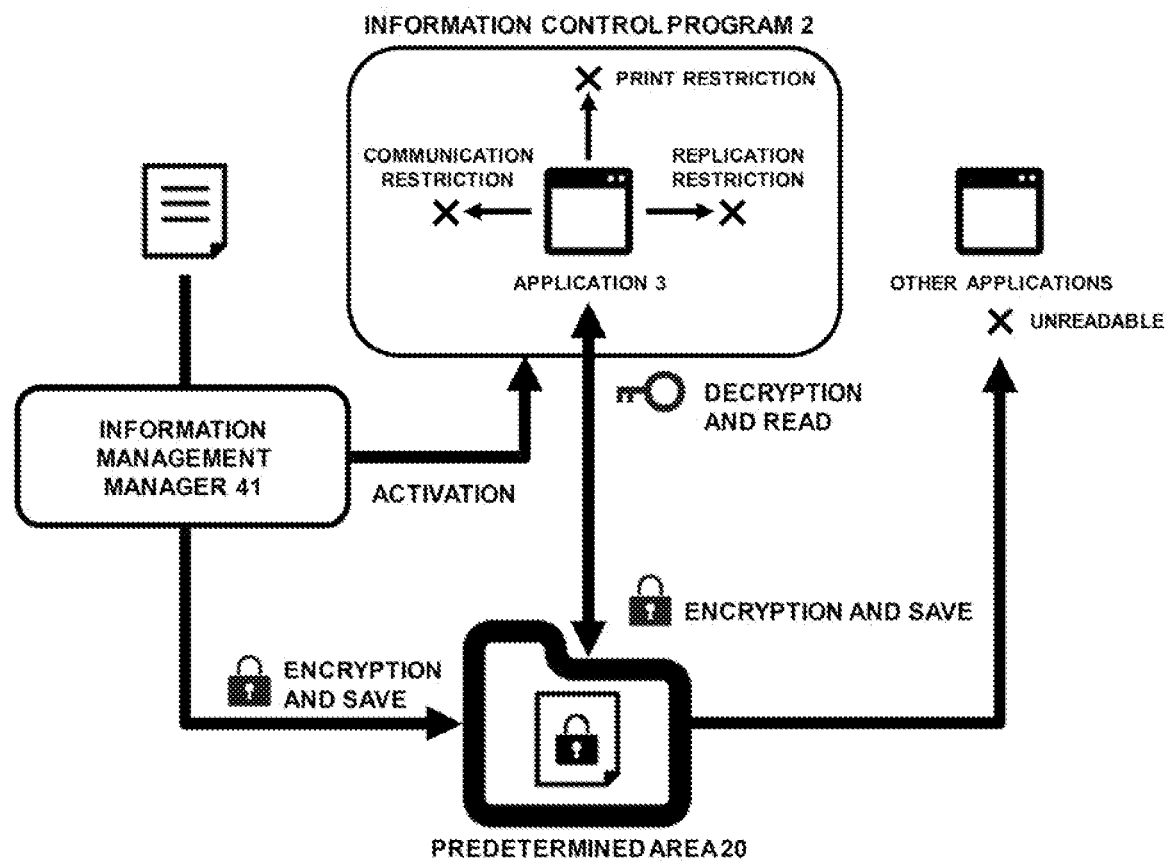
FIG. 3 is a conceptual diagram describing an overview of functions of an information control program 2.

FIG. 3 is a conceptual diagram describing an overview of the function of the information control program 2. The information control program 2 can control the application 3 as will be described below. In FIG. 3, the application 3 is in a state in which it is controlled by the information control program 2. In FIG. 3, the other applications are in a state in which they are not controlled by the information control program 2.

The information control program 2 causes the CPU 22 to function as the information acquiring means M1, the information modifying means M2, and the information transmitting means M3. The information acquiring means M1 has a function of acquiring a file 51 which is the transmitted/received information 50 transmitted and received between the application 3 and the OS 4, or the control information 53. The information modifying means M2 has a function of adding a predetermined modification to the transmitted/received information 50 acquired by the information acquiring means M1. The information transmitting means M3 has a function of transmitting, to the application 3 or the OS 4, the transmitted/received information 50 to which the predetermined modification is added by the information modifying means M2. The information transmitting means M3 has a function of transmitting to the OS 4 the transmitted/received information 50 to which the predetermined modification is added by the information modifying means M2 which is transmitted from the application 3 to the OS 4 and transmitting to the application 3 the transmitted/received information 50 to which the predetermined modification is added by the information modifying means M2 which is transmitted from the OS 4 to the application 3. Also, the information transmitting means M3 can also transmit back to the application 3 the transmitted/received information 50 to which the predetermined modification is added by the information modifying means M2 which is transmitted from the application 3 to the OS 4 and transmit back to the OS 4 the transmitted/received information 50 to which the predetermined modification is added by the information modifying means M2 which is transmitted from the OS 4 to the application 3. The functions of the save restricting means M4, the storage destination restricting means M5, the decrypting means M6, the replication restricting means M7, the image replication restricting means M8, the print restricting means M9, the communication restricting means M10, and the confirming means M11 of the information modifying means M2 will be described more specifically.

<Save Restricting Means M4>

The save restricting means M4 has a function of restricting saving of the data file (file 51) which is not encrypted using a predetermined encryption key 55. That is, the save restricting means M4 has a function of permitting saving of only the file 51 which is encrypted using the predetermined encryption key 55.

In order to save the file 51 generated by the application 3, the application 3 transmits the control information 53 including a command to save the file 51 to the OS 4 (save command 53a). The information control program 2 acquires the storage command 53a through the information acquiring means M1. The storage command 53a includes attribute information (property) of the file 51, information (path) of a storage destination, information of an encryption key, and the like. Here, the save restricting means M4 has a function of forcibly changing the information of the encryption key among the information included in the save command 53a to the predetermined encryption key 55. Accordingly, in the saving operation of file 51 by the application 3, even when the encryption key is not set in the file 51 or even when an arbitrary encryption key is set, it is forcibly encrypted by the predetermined encryption key 55. The save restricting means M4 encrypts the file 51 using the predetermined encryption key 55. An encrypting process may be configured to be performed by the information control program 2 or the OS 4.

Here, it is desirable that the predetermined encryption key 55 is an information stored in an information storage area which is accessible while the information control program 2 is activated. The information storage area accessible while the information control program 2 is running is the storage area where the information control program 2 is located at a storage unit of a terminal accessible during the activation of the information control program 2. A user terminal 11 wherein the information control program 2 and the application 3 are disposed and used by the user U, a server terminal 13 connected to the user terminal 11 so that communication can be performed therebetween, or the like can be used as the terminal accessible by the information control program 2.

It is desirable that the predetermined encryption key 55 is randomly generated automatically by the information control program 2, a system management manager 45 to be described later, or other programs. A key length of the predetermined encryption key 55 is not particularly limited, however it is preferably 128 bits or more, and more preferably, about 256 bits. An encryption scheme of the predetermined encryption key 55 is also not particularly limited, but, for example, an advanced encryption standard (AES) scheme can be employed. A character string which is arbitrarily set by a system administrator, the user U, or the like in advance may be used as the predetermined encryption key 55 while the strength of security is lowered. The save restricting means M4 can add information of whether or not it is a file encrypted with the predetermined encryption key 55, information of whether or not it is a file encrypted by the save restricting means M4, or the like to the end of data of the file 51 when the file 51 is encrypted using the predetermined encryption key 55.

<Storage Destination Restricting Means M5>

The storage destination restricting means M5 has a function of restricting an area other than the predetermined area 20 in the information storage area (the storage unit 21) from being designated as the storage destination of the file 51. In other words, the storage destination restricting means M5 has a function of permitting the saving only when the predetermined area 20 is designated as the storage destination of the file 51. The storage destination restricting means M5 can allow an error message to be displayed on the display device 29 when the predetermined area 20 is not designated as the storage destination of the file 51. Accordingly, it is possible to notify the user U of an error.

Here, the predetermined area 20 is a storage area disposed in the storage unit 21. The storage unit 21 may be the storage unit 21 included in the user terminal 11 which is used by the user U and includes the OS 4 and the application 3 activated therein. The predetermined area 20 can be displayed in the form of a file folder by a user interface (UI) of the information management manager 41 as will be described later.

The file 51 stored in the predetermined area 20 may be replicated. Then, the replicated file 51 may be stored in a storage unit of another terminal communicably connected to the user terminal 11. Another terminal communicably connected to the user terminal 11 may be a server terminal 13 such as a storage server communicably connected via the Intranet or the Internet. Accordingly, the file 51 stored in the storage unit 23 of the server terminal 13 can be shared among a plurality of users U or among a plurality of user terminals used by a user U. When the shared file 51 is browsed or edited in other user terminals other than the user terminal 11 in which the file 51 is generated, the file 51 may be replicated from the storage unit 23 of the server terminal 13 to storage units of the other user terminals. Hereinafter, "synchronize" indicates an operation of causing information stored in the storage units of the respective terminals to have the same content between the storage unit 21 of the user terminal 11 and the storage unit 23 of the server terminal 13. The file 51 replicated to the storage unit 23 of server terminal 13 or the storage units of the other user terminals is still in a state in which it is encrypted by the predetermined encryption key 55 and can be decrypted only in the user terminal which retains the information of the predetermined encryption key 55.

<Decrypting Means M6>

The decrypting means M6 has a function of decrypting the file 51 stored in the predetermined area 20 using the predetermined encryption key 55. The file 51 in which the transmitted/received information 50 is modified and saved by the information control program 2 is encrypted using the predetermined encryption key 55, and is stored in the predetermined area 20. Therefore, the file 51 can be decrypted by the decrypting means M6 using the predetermined encryption key 55. The decrypting means M6 may transmit the predetermined encryption key 55 for decrypting the file 51 to the application 3 or the OS 4 together with the file 51, and the decrypting process may be executed by the application 3 or the OS 4.

<Replication Restricting Means M7>

The replication restricting means M7 has a function of replicating part of information of the file 51 and restricting the part of the information of the replicated file 51 from being saved in a state in which it can be read by a program other than the application 3. In other words, when part of the information of the file 51 is replicated, the replication restricting means M7 permits the part of the information of the file 51 to be saved in a state in which it can be read by only the application 3 and restricts the part of the information of the file 51 from being saved in a state in which it can be read by a program other than the application 3.

For example, it can be assumed a situation wherein a part of the document is copied as part of the information of the file 51, and the part of the document is pasted to another location in the same document when a document stored in the file 51 is edited using the application 3. At this time, there are cases in which the copied part of the document is stored in an area (for example, a clipboard) of the storage unit 21 in a state in which it can be read by an arbitrary program including the application 3 by the function of the OS 4 (a copy and paste function). In this case, the replication restricting means M7 has a function of restricting the copied part of the document from being stored in a state in which it is read by an arbitrary program other than the application 3.

Specifically, the replication restricting means M7 can save the part of the information of the document in the storage unit 21 in a state in which information of the part of the document is encrypted so that it is not read by other programs. Here, "other programs" can be programs which are not controlled by the information control program 2. In other words, in the case of programs (application 3) controlled by the information control program 2, it is possible to allow a part of the document to be copied and pasted between the programs (the application 3). In other programs mentioned above, since the encrypted part of the document is pasted, the information of the part of the document is unable to be deciphered. When an attempt to paste the encrypted part of the document to a document being edited in other programs is made, the replication restricting means M7 can transmit alert information to other programs and alerts the user that the part of the document is unable to be pasted. The replication restricting means M7 can also be configured to restrict replication of the part of the document itself or saving the document in the storage unit 21 using the copy and paste function.

<Image Replication Restricting Means M8>

The image replication restricting means M8 has a function of restricting replication of the image information of the file 51 displayed on the display device 29 based on the information of the file 51. Here, the image information of the file 51 displayed on the display device 29 based on the information of the file 51 is, for example, image data of the document of the file 51 displayed on the display device 29 when the application 3 or the like is executed. And, as the function of replicating such image information, for example, there is a screen capture function. Examples of the screen capture function include print screen, screen shot, and the like.

The image replication restricting means M8 has a function of disabling an input of a signal for commanding execution of the screen capture function in the user terminal 11. Specifically, the image replication restricting means M8 can disable an input signal by pressing a print screen key or the like disposed on a keyboard which is the input device 30 of the user terminal 11.

The image replication restricting means M8 may also have a function of monitoring an activation command signal of the application 3 having the screen capture function and activating the screen saver when the activation command signal is acquired. Here, the application 3 having the screen capture function can be registered, for example, in a list of applications having the screen capture function stored in the storage unit 23 of the server terminal 13 (hereinafter referred to as a "screen capture application list"). The image replication restricting means M8 can allow the screen saver to be activated when the activation command signal of the application registered in the screen capture application list is acquired. The screen capture application list stored in the server terminal 13 can be shared among a plurality of user terminals 11.

The image replication restricting means M8 allows the image information of the file 51 not to be displayed on the display device 29 by activating the screen saver in accordance with the conditions described above. Here, a screen saver is a function of displaying other information (such as an image) on the display device 29 instead of displaying the image information of the file 51 or the like on the display device 29. Accordingly, it is possible to protect the image information of the file 51 from image acquisition by the screen capture function and photographing the display screen of the display device 29 by a camera or the like.

The image replication restricting means M8 can employ, as the information displayed by the screen saver, a message for urging the user U to terminate the application having the screen capture function. The image replication restricting means M8 can terminate the screen saver and display the original image information when the user U terminates the application having the screen capture function. The original image information is, specifically the image information of the file 51.

There are cases in which the program (application 3) controlled by the information control program 2 has the screen capture function. In this case, when the application 3 transmits a screen capture command, the information acquiring means M1 acquires the screen capture command, and the image replication restricting means M8 restricts all the screen capture commands. Accordingly, even when the application 3 has the screen capture function, the image replication restricting means M8 can restrict the screen capture process.

<Print Restricting Means M9>

The print restricting means M9 has a function of restricting printing of the information of the file 51. In other words, the print restricting means M9 has a function of restricting the information or the like of the document included in the file 51 from being printed on a sheet or the like on the basis of a print command generated by a printout function of the application 3 or the OS 4.

Specifically, when the information acquiring means M1 acquires a print command including a printer designation serving as a print destination, the print restricting means M9 refers to a print destination rejection list. Information such as printers which are not permitted as the print destination is stored in the print destination rejection list preliminarily. The information of the printer or the like can be a printer name, an Internet protocol (IP) address, a media access control (MAC) address, or the like. The print destination rejection list can be arranged on the server terminal 13 or the like so that it can be shared among a plurality of user terminals 11. A list referred to by the print restricting means M9 may be a print destination permission list in which the information such as the printer to be permitted as the print destination is stored instead of the print destination rejection list or may be a print destination list or the like in which information of all printers which can be designated as the print destination and information of whether or not each printer is permitted as the printer destination are stored in association with each other.

The print restricting means M9 collates the printer designation included in the print command with the information of the printer or the like stored in the print destination rejection list. When the printer designation matches the printer information in the print destination rejection list, the print restricting means M9 can block the print command, transmit error information to a print command transmission source (the application 3 or the OS 4), and give an alert indicating that the printout in the designated printer is prohibited to the user U.

<Communication Restricting Means M10>

The information control program 2 includes the communication restricting means M10 which restricts transmission of the information of the file 51 to other terminals other than the user terminal 11 under a specific condition. The communication restricting means M10 includes either or both of an external transmission restricting means M10a and a transmission destination restricting means M10b.

<External Transmission Restricting Means M10a>

The external transmission restricting means M10a has a function of restricting the unencrypted file 51 from being transmitted to other terminals different from the user terminal 11 in which the unencrypted file 51 is stored using a communication function of the user terminal 11. Here, the unencrypted file 51 is a file which is not encrypted using the predetermined encryption key 55, a file which was encrypted using the predetermined encryption key 55 but has been decrypted using the predetermined encryption key 55, or the like. It is possible to determine whether or not the file 51 is encrypted using the predetermined encryption key 55, for example, by confirming identification information added to the end of the data of the file 51. In other words, an unencrypted file is in a state in which it can be decrypted without the information of the predetermined encryption key 55. Examples of the communication function of the user terminal 11 include a communication function using a protocol such as a simple mail transfer protocol (SMTP) in the case of an electronic mail or a hypertext transfer protocol (HTTP). The external transmission restricting means M10a can block the transmission command of the unencrypted file 51 being directed to other terminals different from the user terminal 11.

<Transmission Destination Restricting Means M10b>

The transmission destination restricting means M10b has a function of restricting the file 51 from being transmitted to a transmission destination other than a predetermined transmission destination.

Specifically, when the information acquiring means M1 acquires a transmission command including a designation of a transmission destination, the transmission destination restricting means M10b refers to a transmission destination rejection list. Information of the transmission destination not permitted as the transmission destination is stored in advance in the transmission destination rejection list. Examples of the transmission destination information include an e-mail address, an HTTP address, identification information of a transmission counterparty in the case of transmission via a social networking service (SNS) application, and the like. The print destination rejection list can be arranged in the server terminal 13 or the like so that it can be shared among a plurality of user terminals 11. A list referred to by the transmission destination restricting means M10b may be a transmission destination permission list in which the information of the transmission destination permitted as the transmission destination is stored instead of the transmission destination rejection list or may be a transmission destination list or the like in which information of all transmission destinations which can be designated as the transmission destination and information of whether or not it is permitted as the transmission destination are stored in association with each other.

The print restricting means M9 collates the printer designation included in the print command with the information of the printer or the like stored in the print destination rejection list. When the printer designation matches the printer information in the print destination rejection list, the print restricting means M9 can block the print command, transmit error information to a print command transmission source (the application 3 or the OS 4), and give an alert indicating that the printout in the designated printer is prohibited to the user U.

<Confirming Means M11>

The confirming means M11 has a function of confirming that the file 51 stored in the predetermined area 20 is a file encrypted using the predetermined encryption key 55.

For example, the predetermined area 20 is an area arranged in the storage unit 21 of the user terminal 11, and the information control program 2 which just makes a predetermined modification in the transmitted/received information 50 between the application 3 and the OS 4 is unable to control the predetermined area 20. Therefore, a situation in which the stored data file is stored without executing the information control program 2 may occur in the predetermined area 20. Therefore, in the predetermined area 20, there may be a file which is unable to be decrypted using the predetermined encryption key 55 and to which no encrypting process has been performed using the predetermined encryption key 55. Even in such a situation, it is possible to confirm whether it is a file which can be decrypted by the predetermined encryption key 55 before the decrypting process through the confirming means M11.

The confirming means M11 can identify whether or not the file 51 is a file encrypted using the predetermined encryption key 55, whether or not the file 51 is a file encrypted by the save restricting means M4, or the like based on the identification information added to the end of the file 51 by the save restricting means M4 as described above. When the file 51 is a file encrypted using the predetermined encryption key 55, the confirming means M11 transfers the process to the decrypting means M6, and the file 51 is decrypted by the decrypting means M6. When the confirming means M11 determines that the file 51 is not a file encrypted by the save restricting means M4, the information control program 2 can transmit the file 51 to the application 3 or the OS 4 without performing the decrypting process. When the encryption key used for encryption is unable to be identified or when it cannot be determined whether or not it is encrypted, the confirming means M11 transmits error information to the application 3 and informs the user U of the error.

<Process of Information Control Program 2>

Figure 4:
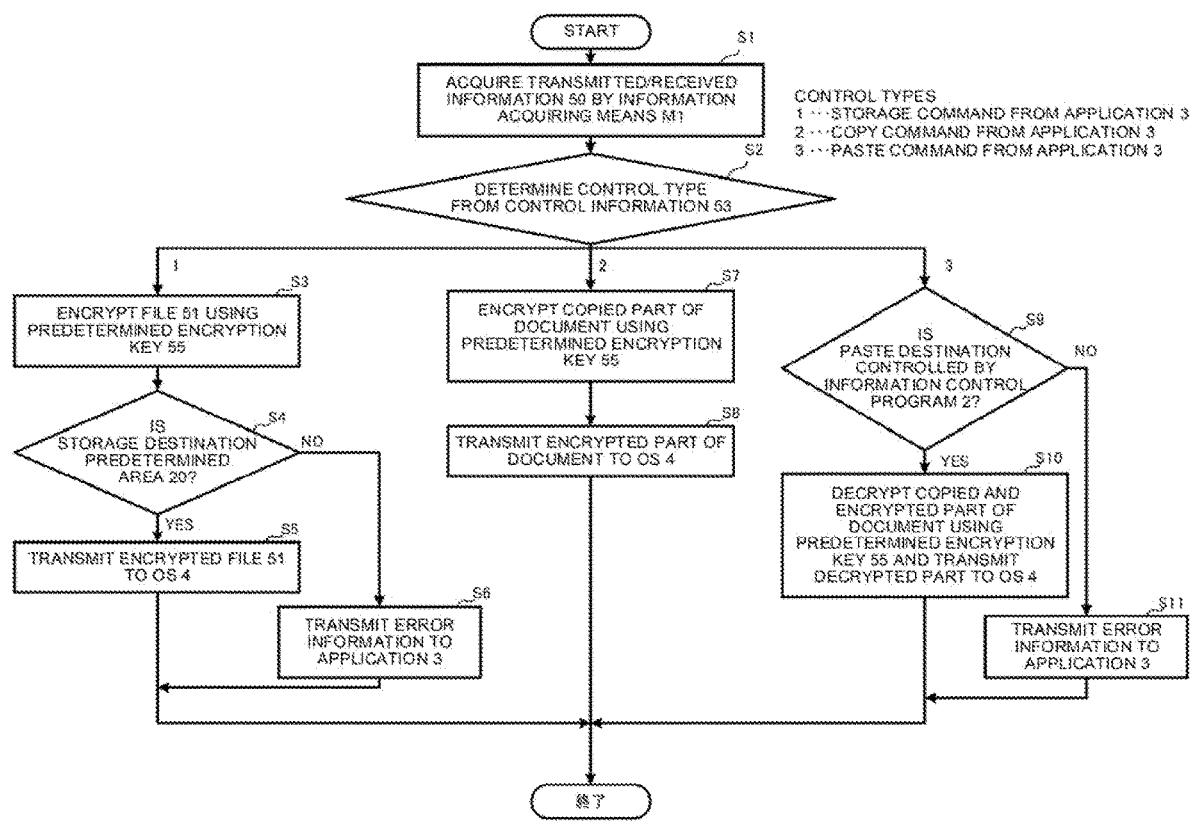
FIG. 4 is a flowchart illustrating a process of an information control program 2.
Figure 5:
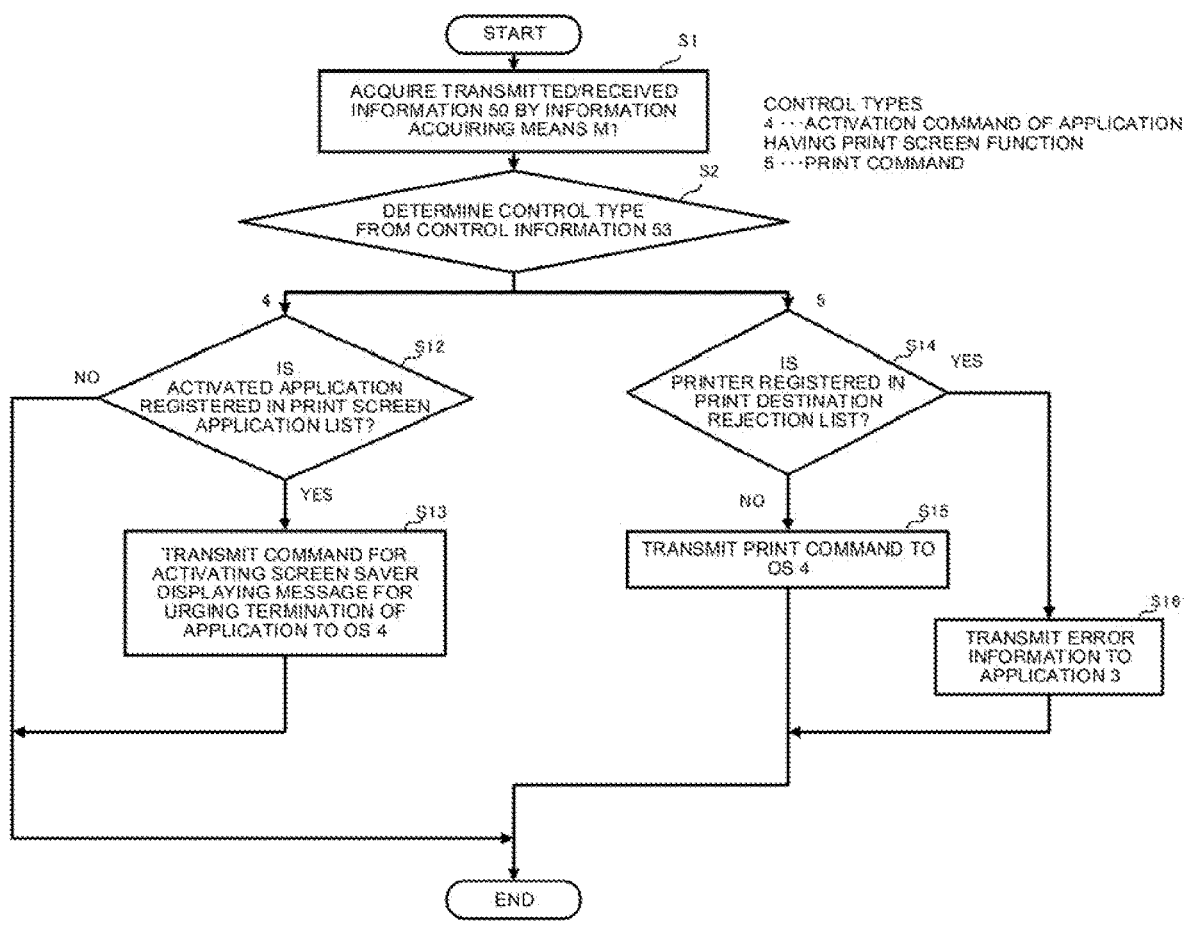
FIG. 5 is a flowchart illustrating another process of an information control program 2.
Figure 6:
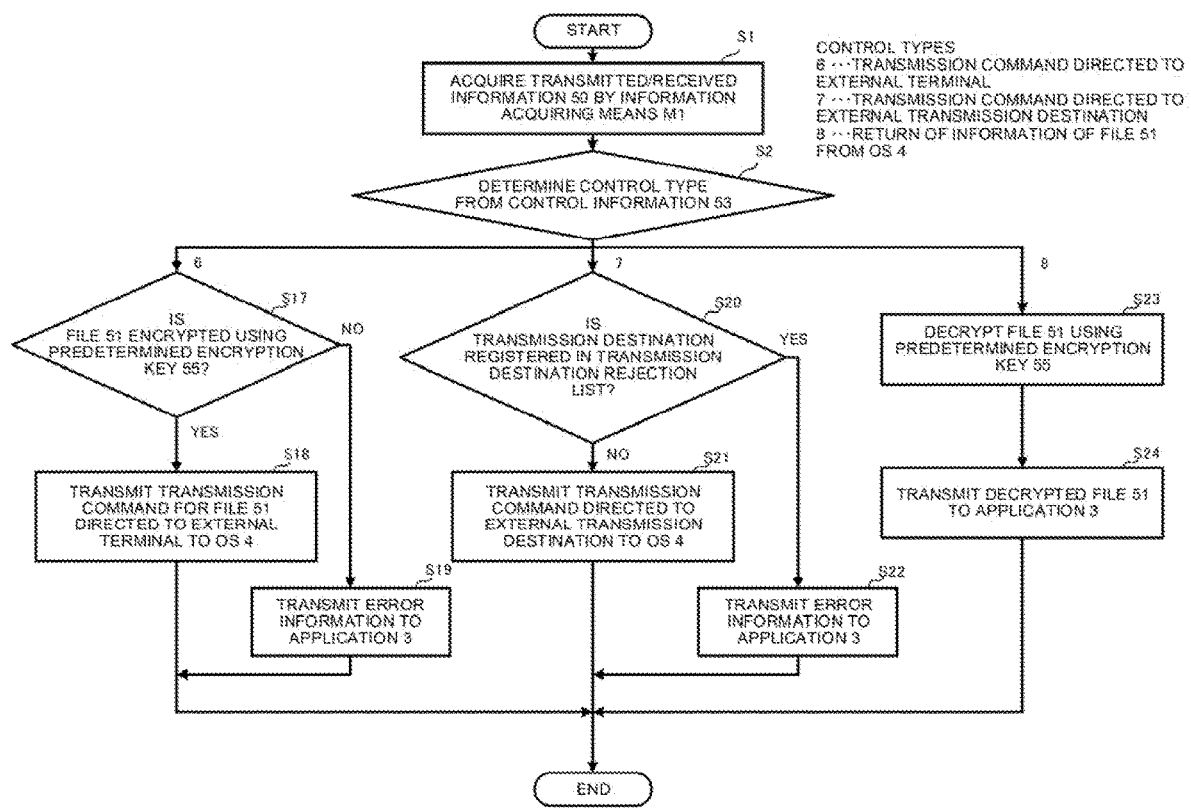
FIG. 6 is a flowchart illustrating still another process of an information control program 2.

Next, the flow of a process by the information control program 2 will be described. FIGS. 4 to 6 are flowcharts illustrating a process of the information control program 2. Hereinafter, each step (S) in the flowcharts of FIGS. 4 to 6 will be described. When the information acquiring means M1 acquires the transmitted/received information 50 between the application 3 and the OS 4 (S1), the information modifying means M2 determines a control type into which the acquired transmitted/received information 50 is classified, from the control information 53 included in the transmitted/received information 50 (S2). In FIGS. 4 to 6, steps S1 and S2 are common.

When the control is a storage command from the application 3 (control type 1 in S2) in the determination of S2 of FIG. 4, the save restricting means M4 encrypts the file 51 using the predetermined encryption key 55 (S3). Next, the storage destination restricting means M5 determines whether or not the predetermined area 20 is designated as the storage destination of the file 51 (S4). When the predetermined area 20 is designated as the storage destination of the file 51 (YES in S4), the information transmitting means M3 transmits the encrypted file 51 to the OS 4 (S5), and the process ends. When the predetermined area 20 is not designated as the storage destination of the file 51 (NO in S4), the storage destination restricting means M5 generates an error information, and the information transmitting means M3 transmits the error information to the application 3 (S6), and the process ends.

When the control is a copy command from the application 3 in the determination of S2 of FIG. 4 (control type 2 in S2), the replication restricting means M7 encrypts a part of the document copied by the copy function using the predetermined encryption key 55 (S7), the information transmitting means M3 transmits the encrypted part of the document to the OS 4 (S8), and the process ends.

When the control is a paste command from the application 3 in the determination of S2 of FIG. 4 (control type 3 in S2), the replication restricting means M7 determines whether or not the paste destination designation included in the paste command indicates the inside of the file opened on the application 3 controlled by the information control program 2 (S9). When the paste destination is the inside of the file opened on the application 3 controlled by the information control program 2 (YES in S9), the replication restricting means M7 decrypts a part of the document which is copied and encrypted using the predetermined encryption key 55 in step S7 using the predetermined encryption key 55, and transmits the part of the document decrypted by the information transmitting means M3 to the OS 4 (S10). When the paste destination is not the inside of the file opened on the application 3 controlled by the information control program 2 (NO in S9), the replication restricting means M7 creates alert information indicating that the paste is prohibited, and the information transmitting means M3 transmits the alert information to the application 3 (S11).

When the control is an activation command of the application having the screen capture function in the determination of S2 in FIG. 5 (control type 4 in S2), the image replication restricting means M8 determines whether or not the application activated by the activation command is registered in the screen capture application (S12). When the activated application is registered in the screen capture application list (YES in S12), the image replication restricting means M8 generates a command for activating the screen saver that displays a message for urging the user U to terminate the application, the information transmitting means M3 transmits the command to the OS 4 (S13), and the process ends. Accordingly, even when the application having the screen capture function is activated, the screen saver is displayed on the display device 29, and thus the image information of the file 51 is not displayed, and the image is not copied by the screen capture function. When the activated application is not registered in the screen capture application list (NO in S12), the image replication restricting means M8 does not modify the activation command, the information transmitting means M3 transmits the activation command to the OS 4 without modification, and the process ends.

When the control is a print command in the determination of S2 of FIG. 5 (control type 5 in S2), the print restricting means M9 determines whether or not the printer registered as the printer destination is registered in the print destination rejection list (S14). When the print restricting means M9 determines that the printer designated as print destination is not registered in the print destination rejection list (NO in S14), the information transmitting means M3 transmits the print command to the OS 4 (S15), and the process ends. When the print restricting means M9 determines that the printer designated as the print destination is registered in the print destination rejection list (YES in S14), the print restricting means M9 generates an error information, and the information transmitting means M3 transmits the error information to the application 3 (S16), and the process ends.

When the control is a transmission command directed to an external terminal in the determination of S2 of FIG. 6 (control type 6 in S2), the external transmission restricting means M10a determines whether or not the file 51 to be transmitted is encrypted using the predetermined encryption key 55 (S17). When the external transmission restricting means M10a determines that the file 51 to be transmitted is encrypted using the predetermined encryption key 55 (YES in S17), the information transmitting means M3 transmits the transmission command directed to the external terminal of the file 51 to the OS 4 (S18), and the process ends. When the external transmission restricting means M10a determines that the file 51 to be transmitted is not encrypted using the predetermined encryption key 55 (NO in S17), the external transmission restricting means M10a generates an error information, the information transmitting means M3 transmits the error information to the application 3 (S19), and the process ends.

When the control is a transmission command directed to an external transmission destination in the determination of S2 of FIG. 6 (control type 7 in S2), the transmission destination restricting means M10b determines whether or not the transmission destination is registered in the transmission destination rejection list (S20). When the transmission destination restricting means M10b determines that the transmission destination is not registered in the transmission destination rejection list (NO in S20), the information transmitting means M3 transmits the transmission command directed to the external transmission destination to the OS 4 (S21), and the process ends. When the transmission destination restricting means M10b determines that the transmission destination is registered in the transmission destination rejection list (YES in S20), the transmission destination restricting means M10b generates an error information, the information transmitting means M3 transmits the error information to the application 3 (S22), and the process ends.

In the determination of S2 of FIG. 6, "return of the information of the file 51 from the OS 4" which is the control type 8 means the control information 53 for returning the information of the file 51 from the OS 4 to the application 3 after the OS 4 receives a request to open the file 51 from the application 3 to the OS 4. As the application 3 receives the information of the file 51, the file 51 can be opened on the application 3.

If the information acquiring means M1 acquires the transmitted/received information 50 including the control information 53 when return of the information of the file 51 from the OS 4, the decrypting means M6 decrypts the file 51 using the predetermined encryption key 55 (S23). Then, the information transmitting means M3 transmits the decrypted file 51 to the application 3 (S24), and the process ends. A step of determining whether or not the file 51 is a file encrypted using the predetermined encryption key 55 may be performed before step S24.

<Information Management Manager 41>

Next, the information management manager 41 will be described. The information management manager 41 has a function as an activation program for activating the information control program 2 and a function as a user interface for the user U to confirm and operate control by the information control program 2. The user U can browse and edit the file 51 through the application 3 in a state in which it is controlled by the information control program 2 by opening the file 51 through the information management manager 41.

Figure 7:
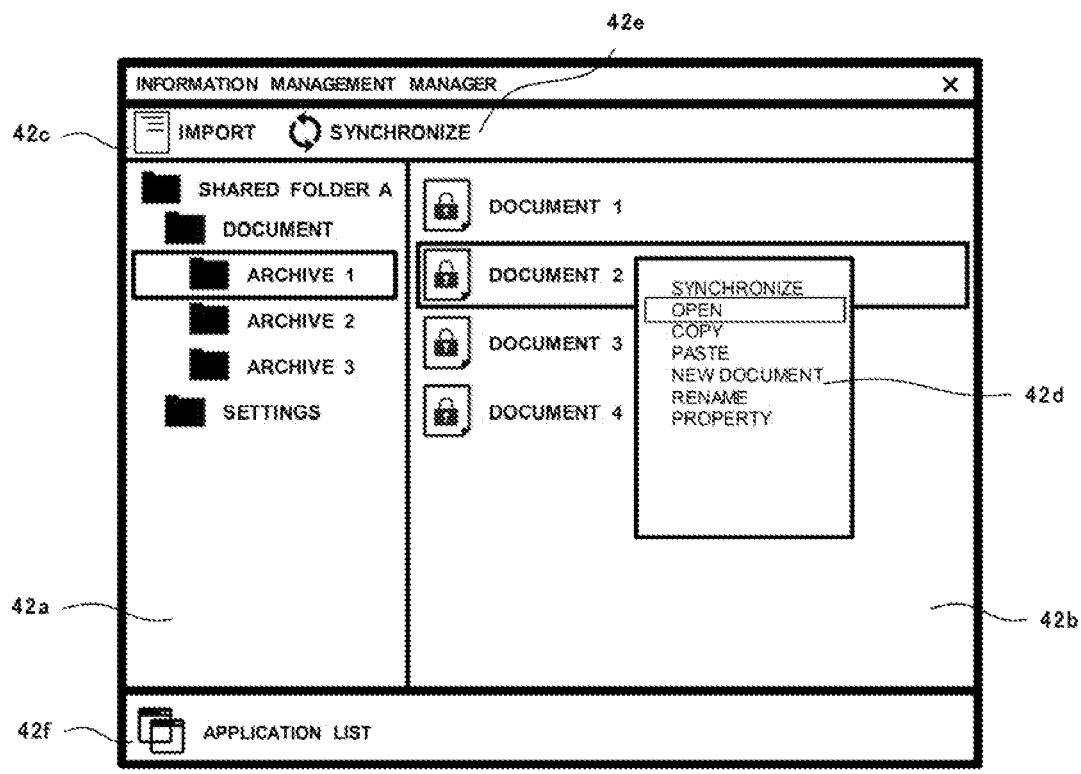
FIG. 7 is a schematic diagram illustrating a screen display example of an information management manager 41.

FIG. 7 is a schematic diagram illustrating a screen display example of the information management manager 41. In FIG. 7, in a navigation display part 42a, folders included in shared folder A are hierarchically displayed with folder icons together with their folder names. Document folder and settings folder are stored in shared folder A, and archive 1 folder, archive 2 folder, and archive 3 folder are stored in document folder. Here, information stored in shared folder A serving as the predetermined area 20 can be synchronized with the information stored in the storage unit 23 of the server terminal 13.

In FIG. 7, archive 1 folder is selected, and in a detail display part 42b, document files stored in the archive 1 folder are displayed with file icons together with their file names. Document 1 file, document 2 file, document 3 file, and document 4 file are stored in the archive 1 folder. Each file is represented by a file icon in which a locked padlock is drawn, and it can be seen that it is stored in shared folder A in an encrypted state using a predetermined encryption key 55.

In FIG. 7, document 2 file of the detail display part 42b is selected, and a menu 42d is displayed in an expanded state. As the menu 42d, "SYNCHRONIZE", "OPEN", "COPY", "NEW DOCUMENT", "RENAME", and "PROPERTY" can be selected and executed.

When "SYNCHRONIZE" is selected from the menu 42d and executed, the information stored in the storage unit 21 of the user terminal 11 and the information stored in the storage unit 23 of the server terminal 13 can be synchronized. Such a synchronization operation can also be executed by pressing SYNCHRONIZE button 42e. The execution of each item of the menu 42d and the pressing of various types of buttons can be realized, for example, by clicking (left click) on a mouse which is an input device.

When "OPEN" is executed from the menu 42d, the selected document 2 file is opened. Specifically, the information management manager 41 allows the application 3 to transmit a command a1 to the OS 4 to open the document 2 file. The information control program 2 which acquires the command a1 by the information acquiring means M1 transmits to the OS 4 a command for decrypting the document 2 file and a command a2 to which the information of the predetermined encryption key 55 for decrypting is added, in response to the command a1. Upon receiving the command a2, the OS 4 decrypts the document 2 file using the predetermined encryption key 55, and transmits information of the decrypted document 2 file to the application 3.

When "COPY" is executed from the menu 42d, the document 2 file is replicated. The information management manager 41 may be configured to display a selection screen for allowing the user U to select an area for storing the information of the copied document 2 file. When "NEW DOCUMENT" is executed from the menu 42d, a new document file is created. The information management manager 41 may be configured to display a selection screen for allowing the user U to select an area for storing information of a newly created document file. When "RENAME" is executed from the menu 42d, the name of the document 2 file is changed. The information management manager 41 may be configured to display an input screen for allowing the user U to input information of the name to be changed. When "PROPERTY" is executed from the menu 42d, attribute information of the document 2 file is displayed. The attribute information mentioned here is so-called property information, for example, the name, file size, or the like of the document 2 file.

In FIG. 7, IMPORT button 42c is displayed. When the IMPORT button 42c is pressed, the application 3 is controlled by information control program 2 such that files other than the file 51 encrypted using the predetermined encryption key 55 are encrypted using the predetermined encryption key 55 and stored in shared folder A serving as the predetermined area 20. These processes are realized by a function which the information management manager 41 causes the central processing unit 22 to execute. Accordingly, preceding files generated by the application 3 without control by the information control program 2 can be handled similarly to the file 51 generated by the application 3 controlled by the information control program 2.

In FIG. 7, APPLICATION LIST button 42f is displayed. The information management manager 41 can be configured to display a browsing screen which displays a list of application programs which can be controlled by the information control program 2 when the APPLICATION LIST button 42f is pressed. The application program which can be controlled by the information control program 2 is not particularly limited as long as it transmits and receives information such as various types of commands or data files between the application program and the OS 4.

Second Embodiment

Next, a second embodiment which is an embodiment of an information control system 1 of the present invention will be described. In the second embodiment, an information control system 1 in which there are a plurality of user terminals 11, and information in the predetermined area 20 formed in the storage unit 21 of each user terminal 11 is synchronized with information in the server terminal 13 connected communicably to each user terminal 11 via the Internet will be described.

Figure 8:
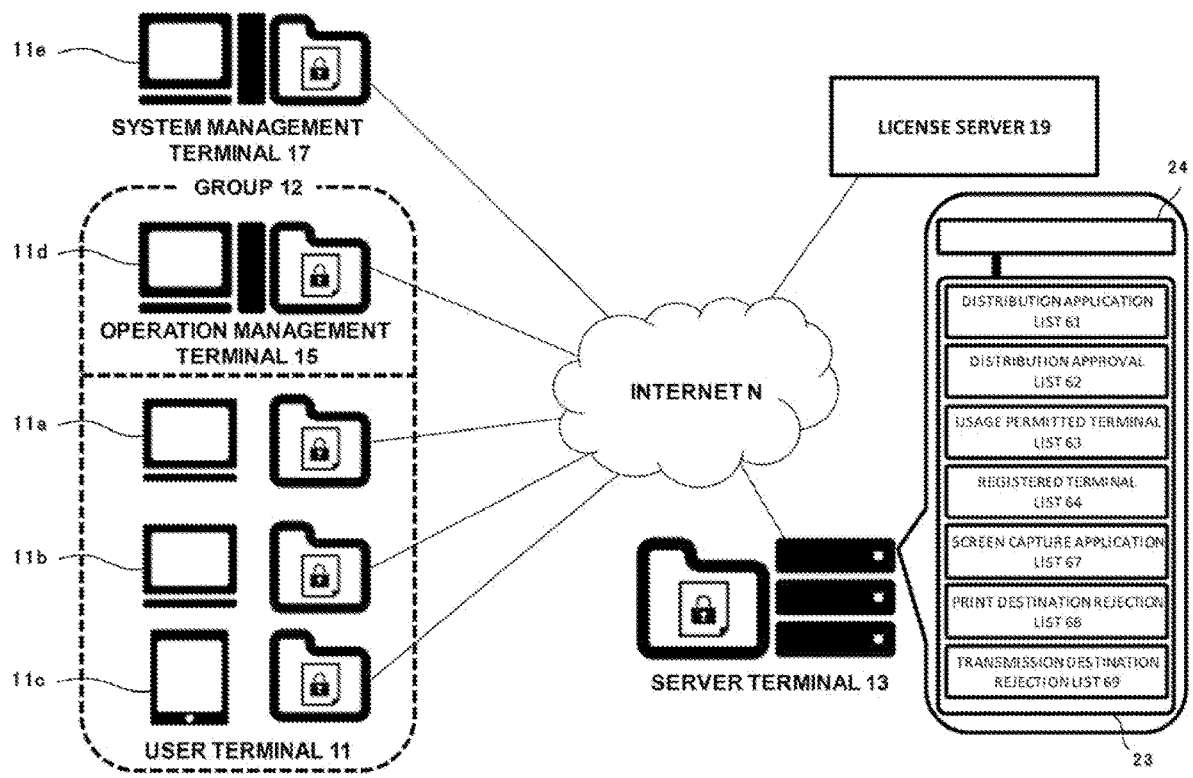
FIG. 8 is a conceptual diagram illustrating an overview of an information control system 1.

FIG. 8 is a conceptual diagram illustrating an overview of the information control system 1. In FIG. 8, a plurality of user terminals 11, a server terminal 13, and a license server 19 are communicably connected to one another via the Internet N. As the user terminal 11, a terminal similar to that described in the first embodiment can be used. The storage unit 21 of the user terminal 11 stores the information control program 2 according to the first embodiment, and the user terminal 11 can realize the function of the information control program 2. As the server terminal 13, a terminal having therein a storage unit 23, a central processing unit 24, a communication device or the like can be used. As the license server 19, a server including a storage unit 23, a central processing unit 24, a communication device, and the like can be used. The storage unit 23 of the server terminal 13 can be used as a cloud storage accessible from the plurality of user terminals 11.

In FIG. 8, user terminals 11a, 11b, 11c, and 11d among the user terminals 11 constitute a group 12. A part of an area in the storage unit 21 of each user terminal 11 is set as the predetermined area 20, and information in the predetermined area 20 set in each user terminal 11 is configured to be synchronized periodically with some pieces of information of the area in the storage unit 23 of the server terminal 13.

Further, a common encryption key is set as the predetermined encryption key 55 in the information control program 2 executed in each of the user terminals 11a, 11b, 11c, and 11d. Further, an encryption key different from the predetermined encryption key 55 is set in another group different from the group 12. Accordingly, the user terminals 11 in the group 12 can share the file 51 in an environment protected in the group 12 by executing the information control program 2 while using the predetermined area 20 of the server terminal 13 as a shared cloud storage. The environment protected by executing the information control program 2 is an environment protected by the function realized by the save restricting means M4, the storage destination restricting means M5, the decrypting means M6, the replication restricting means M7, the image replication restricting means M8, the print restricting means M9, and other means described in the first embodiment.

The server terminal 13 includes the central processing unit 24 and the storage unit 23. A distribution application list 61, a distribution approval list 62, an usage permitted terminal list 63, a registered terminal list 64, a screen capture application list 67, a print destination rejection list 68, a transmission destination rejection list 69, and the like to be described later may be stored in the storage unit 23.

<Information Management Manager 41>

Figure 9:
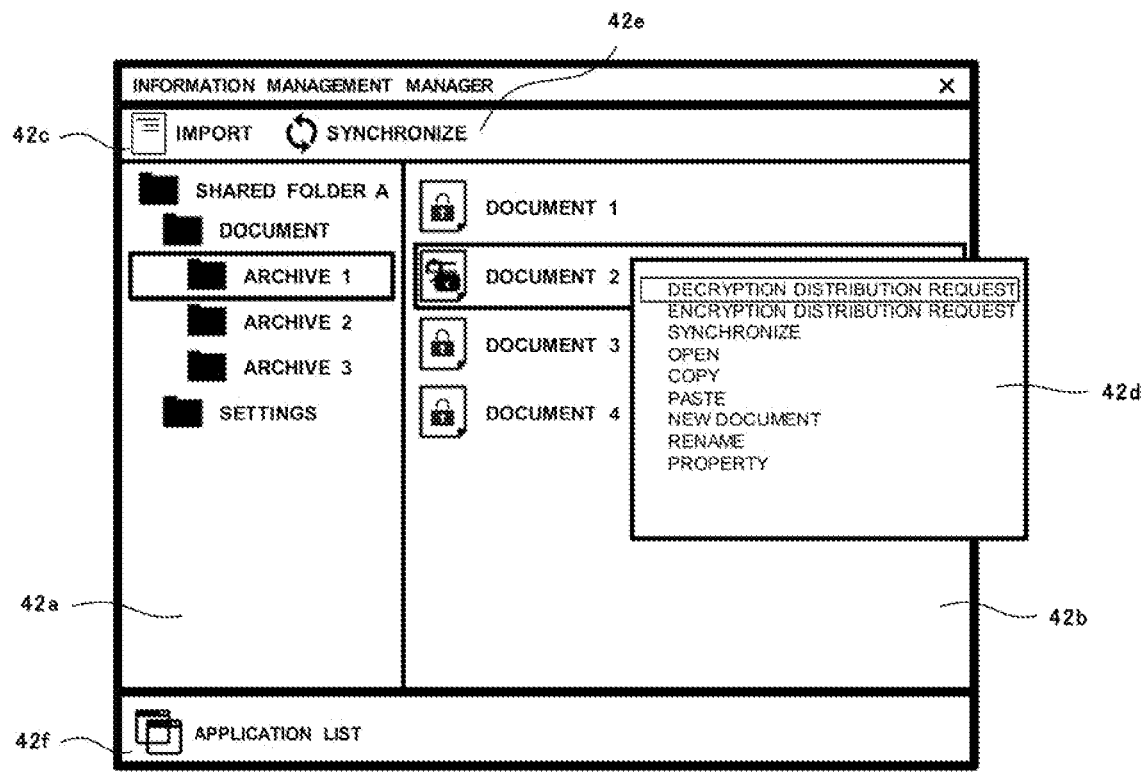
FIG. 9 is a schematic diagram illustrating another screen display example of an information management manager 41.

FIG. 9 is a schematic diagram illustrating another screen display example of the information management manager 41. The another screen display example illustrated in FIG. 9 is different from the screen display example illustrated in FIG. 7 in that items of "DECRYPTION DISTRIBUTION REQUEST" and "ENCRYPTION DISTRIBUTION REQUEST" are added to the menu 42d. The points other than the added items are similar to those described with reference to FIG. 7, and description thereof is here omitted. In FIG. 9, "DECRYPTION DISTRIBUTION REQUEST" and "ENCRYPTION DISTRIBUTION REQUEST" of the menu 42d can be realized by an information distributing means M21 of the information management manager 41 and an information distribution approving means M31 of an operation management manager 43 to be described below.

<Information Distributing Means M21>

The information distributing means M21 included in the information management manager 41 has a function of distributing the file 51 generated by the application 3 controlled by the information control program 2 to an user outside the group 12 (hereinafter referred to as "user Ux") who does not have the predetermined encryption key 55. Accordingly, the file 51 can be shared with the user Ux, and the user Ux can browse and edit the file 51.

Specifically, the information distributing means M21 has a function of setting the predetermined encryption key 55 as the encryption key for decrypting the file 51 so that the OS 4 decrypts the file 51 encrypted using the predetermined encryption key 55 and a function of setting the storage unit 21x of the user terminal 11x as the transmission destination so that the OS 4 transmits the file 51 decrypted to the user terminal 11x used by the user Ux.

Further, the information distributing means M21 may have a function of setting a distribution encryption key 56 different from the predetermined encryption key 55 as the encryption key of the file 51 before transmitting to the user terminal 11x. The information distributing means M21 can receive the distribution encryption key 56 from the operation management manager 43. By transmitting to the user terminal 11x outside the group 12 the file 51 encrypted by the OS 4 using the distribution encryption key 56 set by the information distributing means M21, it is possible to deliver the file 51 in an encrypted state to the user Ux outside the group 12 without disclosing the predetermined encryption key 55 to the user Ux outside the group 12. The encrypting process may be configured to be performed by the information management manager 41. The "ENCRYPTION DISTRIBUTION REQUEST" is realized by the above process. Further, the distribution of the file 51 not involving the encryption by the distribution encryption key 56 is the "DECRYPTION DISTRIBUTION REQUEST".

The distribution encryption key 56 is arbitrary string information or the like and can be stored in a storage unit 25 of an operation management terminal 15. As the distribution encryption key 56, a key generated by the user terminal 11x which is a distribution destination in advance can be stored and managed in the operation management terminal 15. The distribution encryption key 56 is distributed to the user terminal 11 which has transmitted the distribution request through the information distribution approving means M31 of the operation management manager 43. Further, in the user terminal 11, the distribution encryption key 56 can be configured to be discarded after the file 51 is encrypted.

<Operation Management Manager 43>

Next, the operation management manager 43 will be described. The user terminal 11d among the user terminals 11 of the group 12 also undertakes a role of the operation management terminal 15. The operation management manager 43 is stored in the storage unit 25 of the operation management terminal 15 as a program for managing the group 12. The operation management manager 43 is a program which allows the central processing unit 26 of the operation management terminal 15 to realize a group management function of managing the group 12.

The operation management manager 43 includes the information distribution approving means M31. The information distribution approving means M31 undertakes the role of the operation management terminal 15 which receives the distribution request requested from another user terminal 11 in the group 12 and transmits a result of whether or not it is approved to the user terminal 11 on the basis of whether or not it is approved by a user Ud using the user terminal 11d. The user Ud is an administrator (operation manager) of the group 12 and uses and manages the user terminal 11d which is the operation management terminal 15.

Here, the information distribution approving means M31 has a function of receiving the distribution request transmitted from a user terminal 11 in the group 12, a function of notifying the user Ud of the received distribution request and acquiring an input of whether or not it is approved by the user Ud, and a function of transmitting an approval result for the distribution request to the user terminal 11. Further, when the distribution request is an encryption distribution request, the information distribution approving means M31 may have a function of transmitting the distribution encryption key 56 to the user terminal 11.

Figure 10:
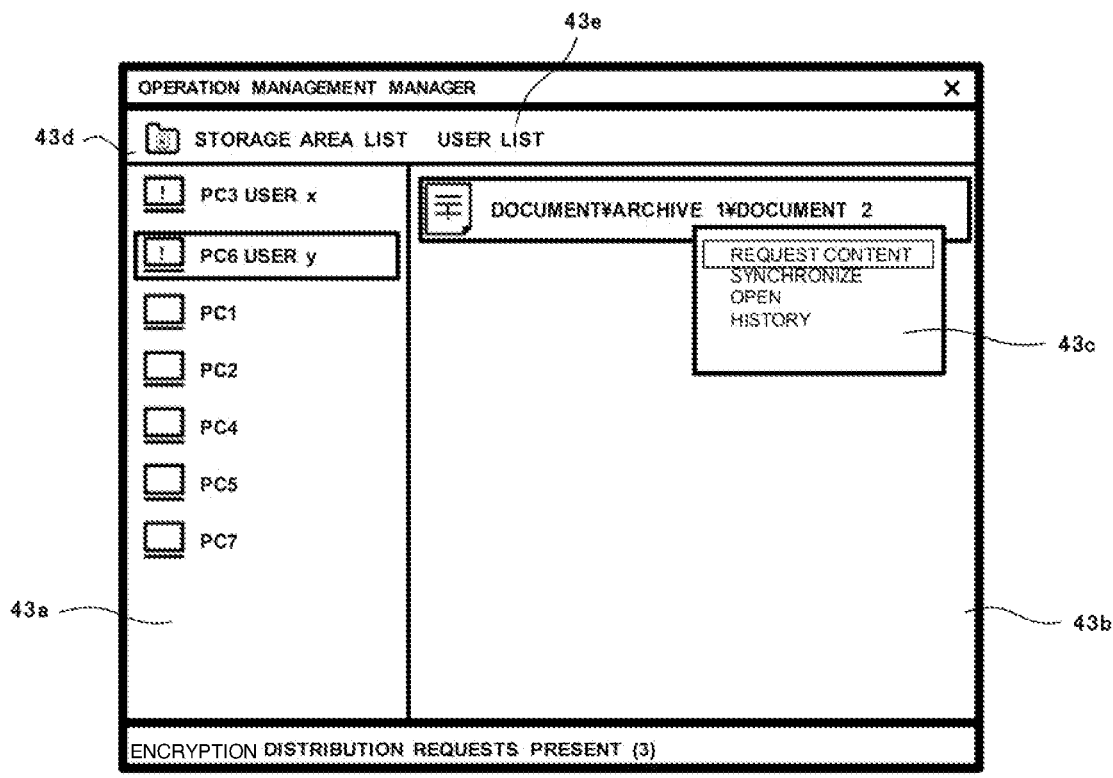
FIG. 10 is a schematic diagram illustrating a screen display example of an operation management manager 43.

FIG. 10 is a schematic diagram illustrating a screen display example of the operation management manager 43. In FIG. 10, in a navigation display part 43a, the user terminals 11 included in group 12 are displayed with terminal icons together with their terminal names. Icons of terminals PC3 and PC6 among the user terminals 11 included in group 12 are marked with "!" (exclamation mark). This is to give a notification indicating that distribution requests are issued from PC3 and PC6. The user of PC3 is "user x" and the user of PC6 is "user y".

In FIG. 10, the user terminal "PC6" of the navigation display part 43a is selected, and document 2 which is stored the predetermined area 20 of the user terminal "PC6" and subjected to the distribution request is displayed in a detail display part 43b. In FIG. 10, document 2 is selected, and a menu 43c is displayed in an expanded state. In the menu 43c, it is possible to select and execute "REQUEST CONTENT", "SYNCHRONIZE", "OPEN", and "HISTORY". Among them, "SYNCHRONIZE" and "OPEN" are similar to the description in the menu 42d of FIG. 7.

When "REQUEST CONTENT" is executed from the menu 43c, the content of the request is displayed together with an approval button and a rejection button by the information distribution approving means M31. The information distribution approving means M31 acquires an input result of pressing of the approval button or pressing of the rejection button determined by the user Ud who is the operation manager. The information distribution approving means M31 transmits an approval result of approval or rejection to the user terminal 11 which has transmitted the distribution request. Here, when the distribution request is an "encryption distribution request", the information distribution approving means M31 transmits the distribution encryption key 56 to the user terminal 11 which has transmitted the distribution request. When "HISTORY" is executed from the menu 43c, the operation management manager 43 can display the history of the previous approved requests related to document 2.

Figure 11:
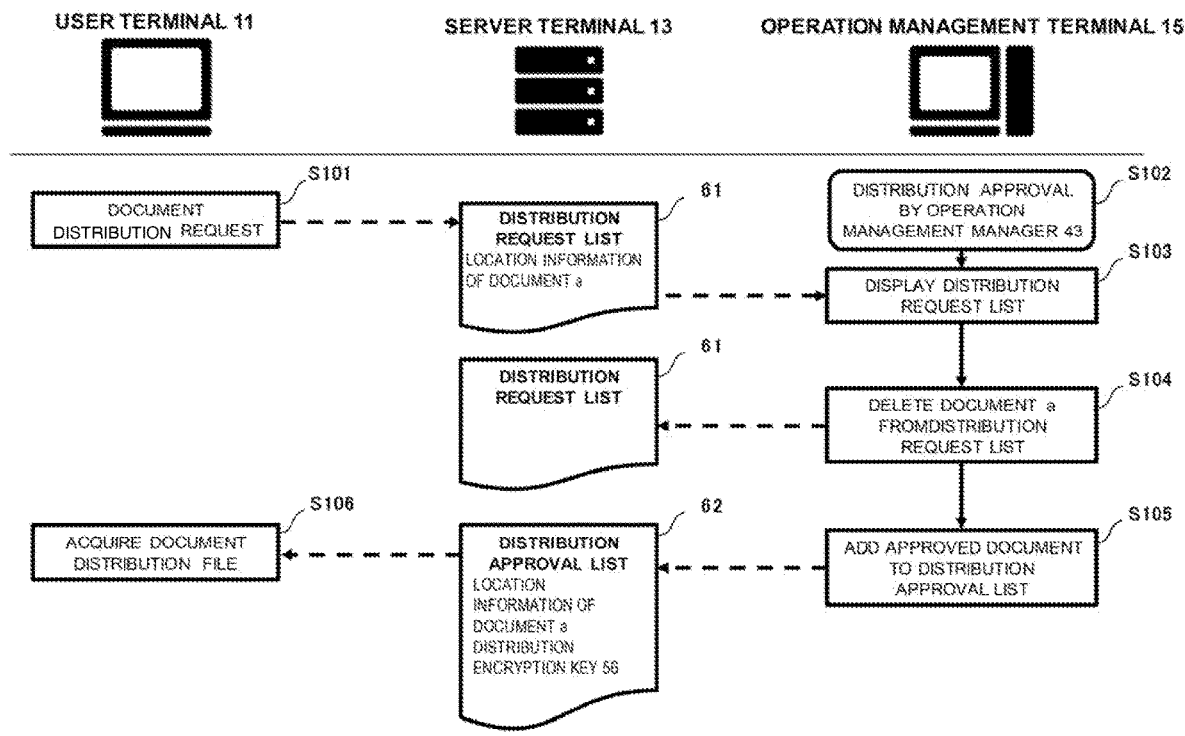
FIG. 11 is a flow diagram illustrating an overview of a document distribution approval process.

FIG. 11 is a flow diagram illustrating an overview of a document distribution approval process. In FIG. 11, a process of an encryption distribution request being generated from the user terminal 11 and of the encryption distribution request being approved by the operation management terminal 15 will be described. In FIG. 11, when a distribution request of a document a is executed in the information management manager 41 of the user terminal 11, location information of the document a is registered in the distribution request list 61 stored in the storage unit 23 of the server terminal 13 (S101). The operation management manager 43 starts the distribution approval process (S102), and in the screen display of the operation management manager 43, "!" is added to the icon of the user terminal 11, and a notification indicating that the distribution request is issued from the user terminal 11 is given to the user Ud who is the administrator (S103). When the user Ud approves the distribution request, the registration of the document a is deleted from the distribution request list 61 by the operation management manager 43 (S104), the location information of the document a and the distribution encryption key 56 are registered in the distribution approval list 62 of the server terminal 13 (S105). The information management manager 41 acquires the distribution encryption key 56 from the distribution approval list 62 (S106), encrypts the document a using the distribution encryption key 56, and transmits it to the distribution destination.

<System Management Manager 45>

Next, the system management manager 45 will be described. The system management manager 45 is a program that is stored in a storage unit 27 of a system management terminal 17 and allows a central processing unit 28 to realize the function of managing the predetermined encryption key 55, the function of registering a terminal which can use the information control system 1, or the like. As the system management terminal 17, one or more of a plurality of user terminals 11 may be registered and set as the system management terminal.

Figure 12:
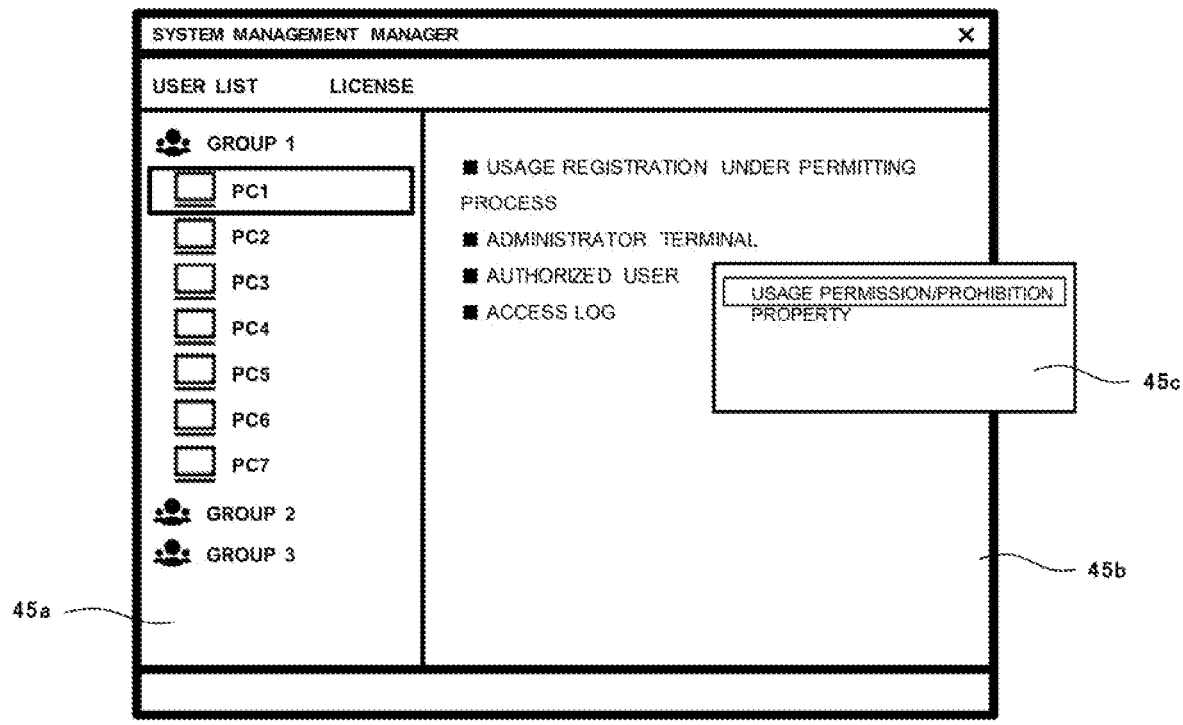
FIG. 12 is a schematic diagram illustrating a screen display example of a system management manager 45.

FIG. 12 is a schematic diagram illustrating a screen display example of the system management manager 45. In FIG. 12, in a navigation display part 45a, groups included in the information control system 1 are displayed with group icons together with their group names, and among them, group 1 is expanded and the user terminals 11 included in group 1 are displayed with terminal icons together with their terminal names. In FIG. 12, PC1 among a plurality of user terminals 11 is selected, and attribute information or the like related to the PC1 is displayed in a detail display part 45b. In the detail display part 45b, specifically, information related to PC1 such as "USAGE REGISTRATION UNDER PERMITTING PROCESS", "ADMINISTRATOR TERMINAL", "AUTHORIZED USER", and "ACCESS LOG" is displayed.

In FIG. 12, "USAGE REGISTRATION UNDER PERMITTING PROCESS" is selected, and a menu 45c related to usage registration permission is expanded and displayed. In the menu 45c, "USAGE PERMISSION/PROHIBITION" and "PROPERTY" are displayed to be selectable and executable. When "USAGE PERMISSION/PROHIBITION" is selected and executed, a selection screen which displays whether the PC1 is permitted to be incorporated into the information control system 1 (usage permission) or prohibited from being incorporated into the information control system 1 (usage prohibition) to be selectable by the user is displayed. In FIG. 12, the PC1 is in a state of "USAGE REGISTRATION UNDER PERMITTING PROCESS" but when the user Ue selects usage prohibition in the selection screen, the registration of the PC1 in the information control system 1 is canceled. The PC1 which has been deregistered from the information control system 1 is unable to browse and edit the file encrypted with the predetermined encryption key 55 since the predetermined encryption key 55 is deleted. If "PROPERTY" is selected and executed, attribute information related to the PC1 is displayed.

"ADMINISTRATOR TERMINAL" displayed in the detail display part 45b indicates that the PC1 is the operation management terminal 15. Also, when "AUTHORIZED USER" is selected, a list of users who can use the PC1 are listed. When "ACCESS LOG" is selected, a list of access logs to the PC1 is displayed.

Figure 13:
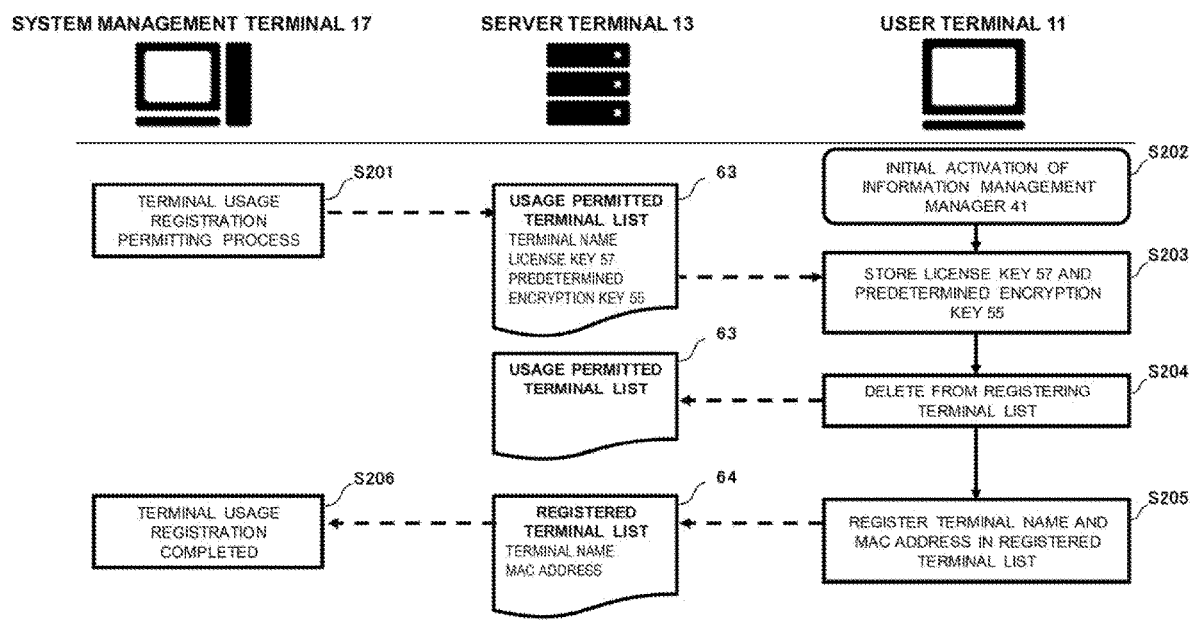
FIG. 13 is a flow diagram illustrating an overview of a registration process of a user terminal 11.

Next, the process of registering the user terminal 11 in the information control system 1 and distributing the predetermined encryption key 55 to the user terminal 11 will be described with reference to FIG. 13. FIG. 13 is a flow diagram illustrating an overview of the process of registering the user terminal 11. The system management manager 45 registers the user terminal 11 in the usage permitted terminal list 63 stored in the storage unit 23 of the server terminal 13 in a state in which a license key 57 (to be described later) and the predetermined encryption key 55 are associated with the terminal name together with the information of the terminal name of the user terminal 11 as preparation for registering the user terminal 11 in the information control system 1 (S201). In the user terminal 11, when the information management manager 41 is initially started (S202), the information control program 2 allows the license key 57 and the predetermined encryption key 55 associated with the terminal name of the user terminal 11 to be stored in the storage unit 21 of the user terminal 11 by referring to the usage permitted terminal list 63 of the server terminal 13 (S203). Thereafter, the information control program 2 deletes the registration related to the user terminal 11 from the usage permitted terminal list 63 (S204). Then, the information control program 2 registers a media access control (MAC) address which is a physical address uniquely allocated to the user terminal 11 in the registered terminal list 64 stored in storage unit 23 of server terminal 13 together with the terminal name of the user terminal 11 (S205). When the system management manager 45 confirms the registration of the user terminal 11 in the registered terminal list 64 (S206), the user terminal 11 is registered in the information control system 1.

Here, the license key 57 is an encryption key issued by the license server 19 as a random value upon request of the system management manager 45 when the information control system 1 is installed. The license key 57 is stored in the storage unit 27 of the system management terminal 17 by the system management manager 45. The license key 57 is used to encrypt setting information of the system or each terminal shared among the terminals constituting the information control system 1 or to encrypt a shared file communicated between terminals. Accordingly, the setting information and the like among the terminals constituting the information control system 1 are protected in the information control system 1.

Figure 14:
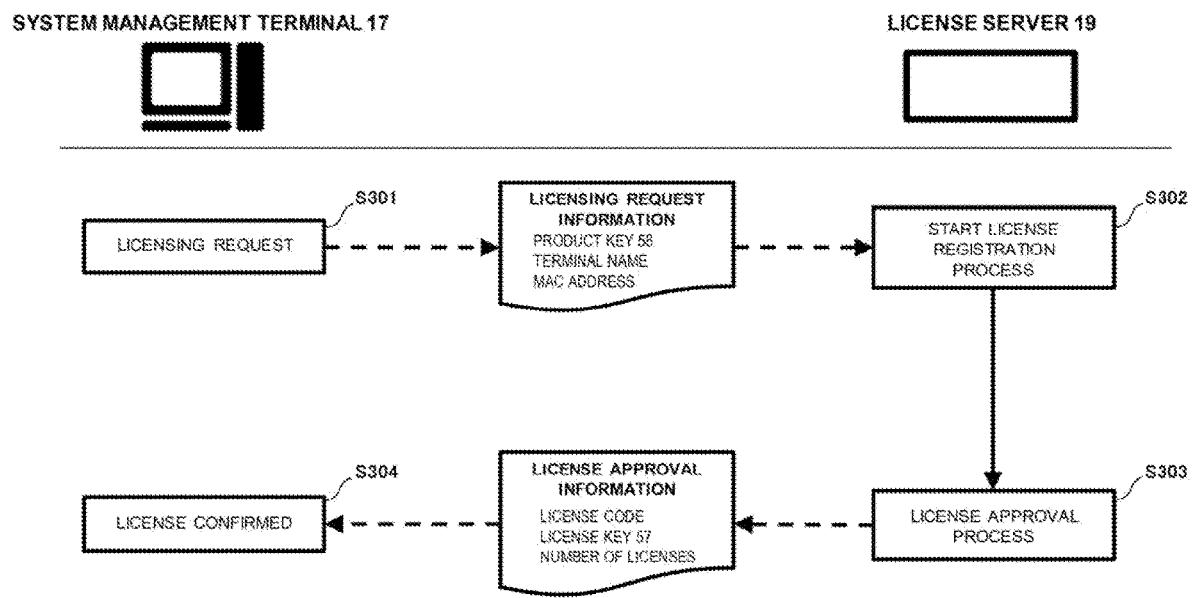
FIG. 14 is a flow chart illustrating an overview of a license authentication process.

Next, a license authentication process will be described with reference to FIG. 14. FIG. 14 is a flow diagram illustrating an overview of the license authentication process. The system management manager 45 starts license application and transmits licensing request information 65 to the license server 19 (S301). The licensing request information 65 includes a product key 58 uniquely allocated to the system management manager 45 or the information control system 1, the terminal name of the system management terminal 17, and a physical address thereof. In the license server 19, when the licensing request information 65 is received, license registration process is started (S302). In the license registration process, confirmation or the like of the product key 58 is performed, and the license is approved (S303). When the license is approved, information such as a license code, the license key 57, the number of licenses, or the like is transmitted from the license server 19 to the system management terminal 17 as license approval information 66 (S304). Accordingly, the license authentication of the system management terminal 17 and the information control system 1 is performed.

Although the exemplary embodiments of the present invention have been described above, the present invention is not limited thereto, and various modification or changes can be made within the scope of the gist thereof. For example, the present invention includes the following points.

(Point 1) A point lies in an information control program including a function of adding a predetermined modification to a transmitted/received information which is transmitted and received between an operating system and an application program, the application program being executable on the operating system and capable of generating a data file and saving the data file to an arbitrary information storage area as a storage destination, the function of adding the predetermined modification including a save restriction function of restricting saving of the data file not encrypted using a predetermined encryption key, a storage destination restriction function of restricting an area other than a predetermined area in the information storage area from being designated as the storage destination of the data file, and a decrypting function of decrypting the data file stored in the predetermined area using the predetermined encryption key.

In accordance with this, it is possible to use the application program which has been previously used without modification, and also to improve the security countermeasure when browsing and editing data file on the terminal of the user without installing a new security counter-measure program.

(Point 2) The save restriction function may encrypt the data file using the predetermined encryption key when the data file is not encrypted using the predetermined encryption key.

Accordingly, even if encryption is not performed by the predetermined encryption key, the data file can be forcibly encrypted using the predetermined encryption key.

(Point 3) The function of adding the predetermined modification may further include a replication restricting function of replicating part of information of the data file and restricting the replicated part of the information of the data file from being saved in a state readable by a program other than the application program.

Accordingly, for example, it is possible to restrict part (or all) of the data file from being replicated by a function other than an application such as copy and paste in the user terminal.

(Point 4) The function of adding the predetermined modification may further include an image replication restricting function of restricting replication of image information of the data file displayed on a display device based on the information of the data file.

Accordingly, for example, it is possible to restrict image information of the data file from being replicated by a function other than an application such as the screen shot in the user terminal.

(Point 5) The function of adding the predetermined modification may further include a print restriction function of restricting printing of the information of the data file.

Accordingly, it is possible to restrict the data file from being replicated by the printing function in the user terminal.

(Point 6) The function of adding the predetermined modification may further include an external transmission restriction function of restricting the data file unencrypted using the predetermined encryption key or the data file decrypted using the predetermined encryption key from being transmitted to other terminals different from a terminal that stores the data file unencrypted using the predetermined encryption key or the data file decrypted using the predetermined encryption key.

Accordingly, it is possible to restrict an unencrypted data file from being transmitted to terminals other than the user terminal.

(Point 7) The function of adding the predetermined modification may further include a transmission destination restriction function of restricting the data file from being transmitted to a transmission destination other than a predetermined transmission destination.

Accordingly, it is possible to restrict the data file from being transmitted only to a specific transmission destination.

(Point 8) The function of adding the predetermined modification may further include a confirmation function of confirming that the data file stored in the predetermined area is the data file encrypted using the predetermined encryption key.

Accordingly, even when a file stored in a predetermined area without going through the information control program is mixed, it is possible to confirm whether or not the file can be decrypted using the predetermined encryption key 55 before the decrypting process.

(Point 9) The present invention is intended for an information control system including the information control program according to any one of points 1 to 8, the application program, the operating system, and the predetermined area storing the data file.

Accordingly, it is possible to provide a system for realizing the function by the information control program.

(Point 10) The predetermined area may be located in a storage unit of a terminal in which the application program and the operating system are activated.

Accordingly, the information control system can be realized in a single terminal.

(Point 11) A replicating means replicating the data file stored in the predetermined area and saving the data file in a storage unit of a storage unit of another terminal communicably connected to the terminal may be provided.

Accordingly, the information control system can be realized by a plurality of terminals in which the information control program is activated.

(Point 12) The present invention is intended for an information control method including adding a predetermined modification to transmitted/received information which is transmitted and received between an operating system and an application program, the application program being executable on the operating system and capable of generating a data file and saving the data file to an arbitrary information storage area as a storage destination, the predetermined modification including restricting saving of the data file not encrypted using a predetermined encryption key, restricting an area other than a predetermined area in the information storage area from being designated as the storage destination of the data file, and decrypting the data file stored in the predetermined area using the predetermined encryption key.

(Point 13) The information control method may include encrypting the data file using the predetermined encryption key when the data file is not encrypted using the predetermined encryption key.

(Point 14) The information control method may include replicating part of information of the data file and restricting the replicated part of the information of the data file from being saved in a state readable by a program other than the application program.

(Point 13) The information control method may include restricting replication of image information of the data file displayed on a display device based on the information of the data file.

(Point 14) The information control method may include restricting printing of the information of the data file.

(Point 15) The information control method may further include restricting the data file unencrypted using the predetermined encryption key or the data file decrypted using the predetermined encryption key from being transmitted to other terminals different from a terminal that stores the data file unencrypted using the predetermined encryption key or the data file decrypted using the predetermined encryption key.

(Point 16) The information control method may further include restricting the data file from being transmitted to a transmission destination other than a predetermined transmission destination.

(Point 17) The information control method may further include confirming that the data file stored in the predetermined area is the data file encrypted using the predetermined encryption key.

REFERENCE SIGNS LIST

1: information control system
2: information control program
3: document preparation application (application)
4: operating system (OS)
10: terminal
11: user terminal
12: group
13: server terminal
15: operation management terminal
17: system management terminal
19: license server
20: predetermined area
21: storage unit (user terminal)
22: central processing unit (user terminal)
23: storage unit (server)
24: central processing unit (server)
25: storage unit (operation management terminal)
26: central processing unit (operation management terminal)
27: storage unit (system management terminal)
28: central processing unit (system management terminal)
29: display device
41: information management manager
42$a$, 43$a$: navigation display part
42$b$, 43$b$: detail display part
42$c$: import button
42$d$, 43$c$: menu
42$e$: synchronization button
42$f$: application list button
43: operation management manager
43$d$: shared folder list button
43$e$: user list button
45: system management manager
50: transmitted/received information
51: document file
53: control information
55: predetermined encryption key
56: distribution encryption key
57: license key
58: product key
61: distribution application list
62: distribution approval list
63: usage permitted terminal list
64: registered terminal list
65: licensing request information
66: license approval information
M1: information acquiring means
M2: information modifying means
M3: information transmitting means
M4: save restricting means
M5: storage destination restricting means
M6: decrypting means
M7: replication restricting means
M8: image replication restricting means
M9: print restricting means
M10: communication restricting means
M10$a$: external transmission restricting means
M10$b$: transmission destination restricting means
M11: confirming means
M21: information distributing means
M31: information distribution approving means
N: Internet
U: user

What is claimed is:

1. A non-transitory computer-readable medium storing an information control program configured to carry out instructions, comprising:

instructions for adding a predetermined modification to a transmitted/received information which is transmitted and received between an operating system and an application program, the application program being executable on the operating system and capable of generating a data file and saving the data file to an arbitrary information storage area as a storage destination, wherein the instructions for adding the predetermined modification comprise:

save restriction instructions for (i) permitting saving of the data file only when the data file is encrypted using a predetermined encryption key, storage destination restriction instructions for permitting the saving of the data file only when a predetermined area in the information storage area is designated as the storage destination of the data file, decrypting instructions for decrypting the data file stored in the predetermined area using the predetermined encryption key, image replication restricting instructions for (i) restricting replication of image information of the data file displayed on a display device based on the information of the data file, (ii) disabling input of a signal for executing screen capture, (iii) protecting the image information from acquisition by photography of a display screen of the display device, and (iv) terminating a screen saver and displaying the image information when a user terminates an application having the screen capture function, and replication restricting instructions for (i) replicating part of information of the data file, (ii) permitting the replicated part of the information of the data file to be saved only in an encrypted state readable by the application program, and (iii) providing one or more alerts to the user when an attempt to paste the replicated part of the information of the data file to a document being edited in a program other than the application program, wherein the one or more alerts inform the user that the replicated part of the information cannot be passed to the document, wherein the predetermined encryption key is stored in the predetermined area in the information storage area, and wherein the predetermined encryption key is automatically generated by the information control program.

2. The non-transitory computer-readable medium according to claim 1, wherein the replication restricting instructions are further for (iv) restricting saving of the document using a copy and paste function, wherein the state is an encrypted state.

3. The non-transitory computer-readable medium according to claim 1, wherein the instructions of adding the predetermined modification further comprise:

print restriction instructions for (i) permitting printing of the information of the data file only when a designated printer listed on a list of permitted print destinations is used, and (ii) providing one or more additional alerts to the user when a printer that is not on the list of permitted print destinations is used, wherein the one or more additional alerts inform the user that the printer cannot be used to print the information of the data file.

4. The non-transitory computer-readable medium according to claim 1, wherein the instructions of adding the predetermined modification further comprise:

external transmission restriction instructions for restricting the data file unencrypted using the predetermined encryption key or the data file decrypted using the predetermined encryption key from being transmitted to other terminals different from a terminal that stores the data file unencrypted using the predetermined encryption key or the data file decrypted using the predetermined encryption key.

5. The non-transitory computer-readable medium according to claim 1, wherein the instructions of adding the predetermined modification further comprise:

transmission destination restriction instructions for restricting the data file from being transmitted to a transmission destination other than a predetermined transmission destination.

6. The non-transitory computer-readable medium according to claim 1, wherein the instructions of adding the predetermined modification further comprise:

confirmation instructions for confirming that the data file stored in the predetermined area is the data file encrypted using the predetermined encryption key.

7. An information control system, comprising:

the information control program according to claim 1;

the application program;

the operating system; and the predetermined area storing the data file.

8. The information control system according to claim 7, wherein the predetermined area is located in a storage unit of a terminal in which the application program and the operating system are activated.

9. An information control method, comprising:

adding a predetermined modification to transmitted/received information which is transmitted and received between an operating system and an application program, the application program being executable on the operating system and capable of generating a data file and saving the data file to an arbitrary information storage area as a storage destination, wherein the predetermined modification comprises:

permitting saving of the data file only when the data file is encrypted using a predetermined encryption key, permitting the saving of the data file only when a predetermined area in the information storage area is designated as the storage destination of the data file, decrypting the data file stored in the predetermined area using the predetermined encryption key, restricting replication of image information of the data file displayed on a display device based on the information of the data file, disabling input of a signal for executing screen capture, protecting the image information from acquisition by photography of a display screen of the display device, terminating a screen saver and displaying the image information when a user terminates an application having the screen capture function, replicating part of information of the data file, permitting the replicated part of the information of the data file to be saved only in an encrypted state readable by the application program, and providing one or more alerts to the user when an attempt to paste the replicated part of the information of the data file to a document being edited in a program other than the application program, wherein the one or more alerts inform the user that the replicated part of the information cannot be passed to the document, wherein the predetermined encryption key is stored in the predetermined area in the information storage area, and wherein the predetermined encryption key is automatically generated by an information control program.

10. The information control method according to claim 9, further comprising:
  restricting printing of the information of the data file by referring to a list of permitted and/or unpermitted print destinations.

11. The information control method according to claim 9, further comprising:
  restricting the data file unencrypted using the predetermined encryption key or the data file decrypted using the predetermined encryption key from being transmitted to other terminals different from a terminal that stores the data file unencrypted using the predetermined encryption key or the data file decrypted using the predetermined encryption key.

12. The information control method according to claim 9, further comprising:
  restricting the data file from being transmitted to a transmission destination other than a predetermined transmission destination.

13. The information control method according to claim 9, further comprising:
  confirming that the data file stored in the predetermined area is the data file encrypted using the predetermined encryption key.

* * * * *